United States Patent [19]

Filkins

[11] Patent Number: 4,677,868
[45] Date of Patent: Jul. 7, 1987

[54] TRANSMISSION VIBRATION VISCOUS DAMPER

[75] Inventor: Timothy J. Filkins, Elbridge, N.Y.

[73] Assignee: Chrysler Motors Corporation, Highland Park, Mich.

[21] Appl. No.: 850,184

[22] Filed: Apr. 10, 1986

[51] Int. Cl.$^4$ .................. F16H 3/08; F16H 55/14; F16D 3/80

[52] U.S. Cl. ........................ 74/359; 74/411; 74/443; 464/24

[58] Field of Search ............... 74/359, 375, 404, 411, 74/443; 464/24

[56] References Cited

U.S. PATENT DOCUMENTS

| | | | |
|---|---|---|---|
| 2,738,660 | 3/1956 | Gail | 464/24 |
| 2,812,648 | 11/1957 | Croset | 464/24 |
| 3,298,240 | 1/1967 | McDowell et al. | 464/24 X |
| 3,364,768 | 1/1968 | Powell | 74/339 |
| 3,398,594 | 8/1968 | Keller | 74/443 X |
| 3,700,083 | 10/1972 | Ashikawa et al. | 192/53 F |
| 3,834,248 | 9/1974 | Caliri | 74/443 |

FOREIGN PATENT DOCUMENTS

| | | | |
|---|---|---|---|
| 2701205 | 7/1977 | Fed. Rep. of Germany | 464/24 |
| 585332 | 12/1977 | U.S.S.R. | 464/24 |
| 632867 | 11/1978 | U.S.S.R. | 74/411 |

*Primary Examiner*—Allan D. Herrmann
*Attorney, Agent, or Firm*—Edward P. Barthel

[57] ABSTRACT

A torsional vibration viscous damper coupling arrangement for a manual transmission countershaft. The coupling includes a first driven gear journalled on the countershaft and in constant mesh with the input shaft gear. A second driven gear is fixed on the countershaft and is in constant mesh with a speed gear journalled on the main shaft. The first and second driven gears each have a set of longitudinally extending mirror image axial teeth sized to mesh in a loose fitting manner. A diametrical through-bore extends through the countershaft intermediate the first and second driven gears. The spaces between the teeth communicate with the through-bore to define a viscous fluid chamber enclosed by a sleeve surrounding the meshed teeth and sealed to the driven gears. Viscous fluid in the chamber provides a dampening medium obviating the transfer of torsion vibrations from the input shaft to the countershaft. Thus, the coupling isolates all the drive shaft speed gears, in mesh with the countershaft drive gears, from any input shaft torsional vibrations.

9 Claims, 5 Drawing Figures

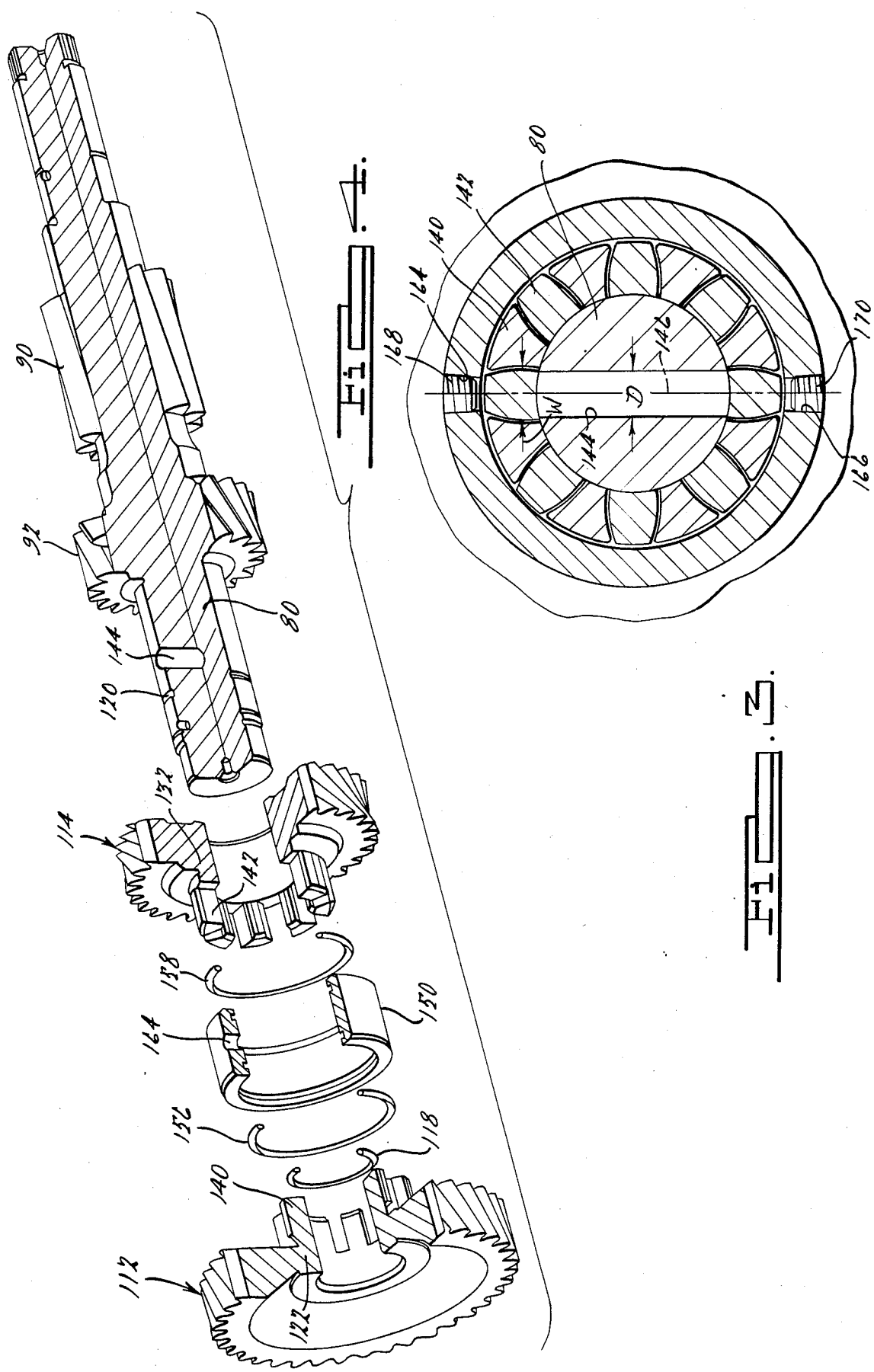

TRANSMISSION VIBRATION VISCOUS DAMPER

BACKGROUND OF THE INVENTION

The present invention relates to vehicle transmissions and, more specifically, to a manual transmission for vehicles which includes a torsional vibration viscous damper coupling.

Torsional viscous damper couplings to reduce vibration and noise in rotary members are well known in the prior art. Exemplary of such couplings are shown, for example, in U.S. Pat. No. 2,812,648 issued Nov. 12, 1957 to L. P. Croset entitled Couplings for Rotary Members; U.S. Pat. No. 2,738,660 issued Mar. 20, 1956 to S. E. Gail entitled Vibration Damper and U.S. Pat. No. 3,298,240 issued Jan. 17, 1967 to C. H. McDowell et al entitled Floating Pinion For Reduction Gears.

The Croset patent discloses a flexible coupling comprising two coaxial rotary members with one having a plurality of recesses receiving gear teeth-like projections on the other member. The recesses and projections engage achieving a limited freedom of rotary movement about the axis of the members. Spaces are provided forming restricted communication from the forward end of each recess to the rearward end of the recess. Silicone oil of a suitable viscosity fills the recesses and spaces and can be forced through restricted holes and annular recesses forming a fluid reservoir to dampen torsional vibration of power transmission between the members.

The Gail patent discloses a hollow shaft having a flexible quill shaft extending axially therein. The quill shaft is provided with external splines arranged to loosely mate with internal splines in the hollow shaft. Hydraulic fluid is interposed in the cavities between the splines to provide a fluid damper for suppressing vibration in the quill shaft.

The McDowell et al patent discloses inner and outer concentric shafts with reduction gears rigidly mounted on the inner shaft. The outer shaft has a greater inner diameter than the outer diameter of the inner shaft providing an annular space therebetween. An end space is formed between the end of the outer shaft and a coupling structure providing an end space with the inner shaft. Viscous fluid is supplied to one of the spaces to provide a hydrodynamic film between the shafts during their rotation.

SUMMARY OF THE INVENTION

An object of the present invention is to provide an improved viscous damper coupling for a vehicle transmission wherein the torque transfer between the engine input shaft drive gear and the countershaft select drive gears is dampened.

It is another object of the present invention to provide a viscous damper coupling as set forth above wherein the coupling is designed in a compact, cost effective manner such that it can be installed on an existing manual transmission with a minimum of design changes and alteration.

In carrying out the foregoing, and other objects, a manual transmission has a drive gear formed integral with its engine input shaft in constant mesh with a first counter-shaft drive gear of a viscous damper coupling. The first drive gear is journally supported adjacent one end of the countershaft and has a cylindrical central hub portion extending inwardly toward the other end of the countershaft. A first set of axial gear teeth extend longitudinally from the first drive gear hub. The first set of gear teeth are loosely meshed with an opposed mirror image second set of axial teeth extending longitudinally from a hub portion of a second drive gear fixed to the countershaft. A diametrical through-bore is provided in the countershaft with its principal axis located in the transverse plane of symmetry of the meshing sets of axial teeth.

The through-bore open ends are in communication with the clearance space between the sets of axial teeth. The through bore together with the interconnected clearance spaces define a fluid dampening chamber. A cylindrical sleeve surrounds the sets of meshing axial teeth and extends longitudinally therebeyond so as to make sealing contact with each hub portion. Sealing means are also provided between the axial bores of the first and second drive gears and the countershaft to complete the fluidtight sealing of the chamber. The chamber is filled with a suitable viscous dampening fluid which prevents torsional vibration, backlash or oscillation rattles which may exist in the engine crankshaft from being transmitted to the countershaft via the transmission input shaft. Thus, all the transmission speed gears mounted on the countershaft are effectively isolated from torsional vibrations of the engine crankshaft.

It is another feature of the present invention to provide a viscous fluid damper coupling for a manual transmission wherein the above described first and second drive gears incorporate a viscous fluid coupling which dampens vibrations to the countershaft speed gears supported thereon while also utilizing the second driven gear of the coupling as one of the transmission drive gears.

These and other objects and advantages of the invention will be more apparent from the following description and drawings.

BRIEF DESCRIPTION OF THE DRAWINGS

FIG. 1A is a schematic of the transmission shift pattern;

FIG. 3 is a transverse fragmentary vertical sectional view of the coupling taken on line 3—3 of FIG. 2; and FIG. 4 is an exploded perspective view, with parts broken away, of the viscous damper coupling and countershaft.

DETAILED DESCRIPTION OF THE INVENTION

Figure 1:
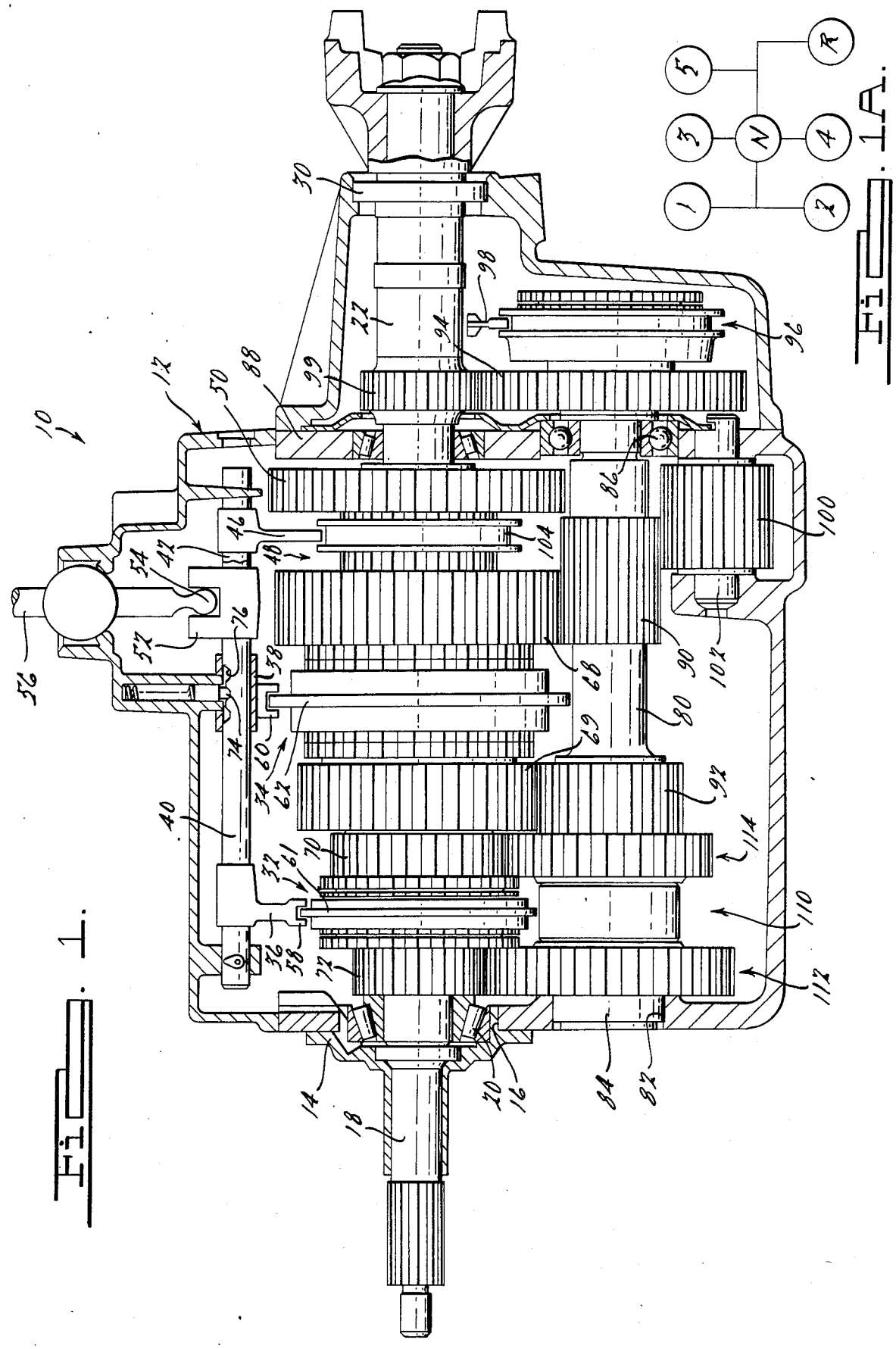
FIG. 1 is a fragmentary vertical sectional view of a transmission housing, showing the internal portions in elevation, incorporating a viscous damper coupling according to this invention.

Referring now to the drawings and more particularly to FIG. 1 a motor vehicle manual transmission 10 includes a gear box housing 12 supporting an input shaft retainer 14 in a circular housing opening 16. A transmission input shaft 18, suitably connected by clutch means to a vehicle engine crankshaft (not shown), is rotatably supported in retainer 14 by bearing assembly 20.

Figure 2:
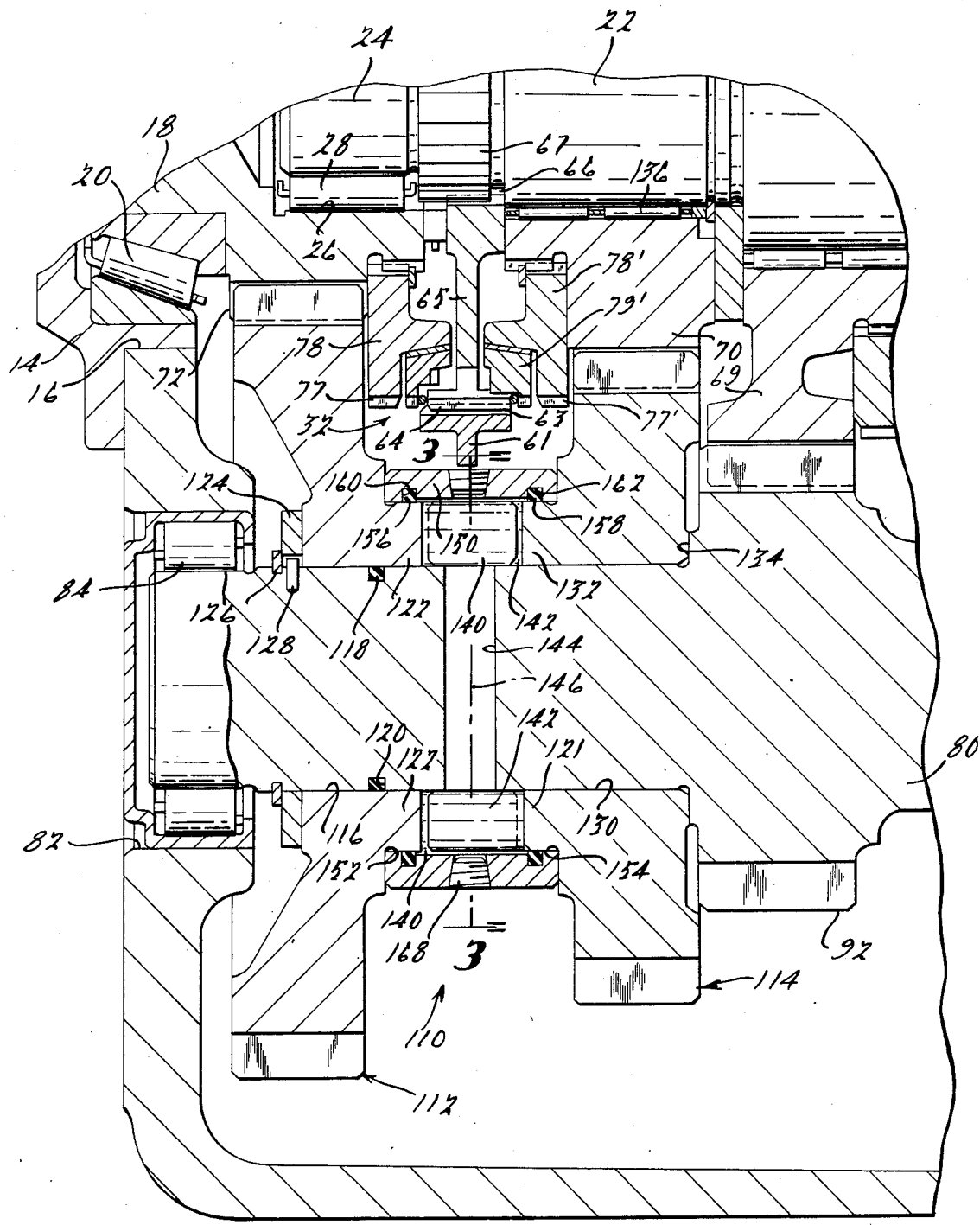
FIG. 2 is an enlarged fragmentary cross-sectional view of the viscous damper coupling and its associated main shaft synchronizer and countershaft portion of the transmission FIG. 1.

As seen in FIG. 2 a transmission output shaft or main shaft 22 has its rearmost pilot end 24 coaxially journalled within input shaft axial blind bore 26 by suitable bearing means such as roller bearings 28. A forward bearing assembly 30, shown in FIG. 1, is coaxially situated with aft bearing assembly 20 for journally supporting the forward end of the main shaft 22 in the housing 12.

Synchromesh units 32 and 34, mounted on the main shaft 22, are actuated by means of shaft forks 36 and 38 respectively, carried on associated gear box selector rails or shafts. Thus, fork 36 is longitudinally slidable with its first selector shaft 40 while the fork 38 is longitudinally slidable with a second parallel selector shaft (not shown). A third selector shaft 42 supports a reverse gear fork 46 operative for shifting a reverse clutch 48 forwardly thereby engaging main shaft reverse gear 50. Each shift rail has a selector lug, such as lug 52, fixed on the first shift rail 40. The lugs are selectively engaged by a shift finger 54 located on the lower end of a speed change lever 56. Reference may be had to U.S. Pat. No. 3,364,768 issued Jan. 23, 1968 to H. G. Powell, the specification of which is incorporated by reference herein, for details of a typical three shift rail manual transmission.

Each of the shift forks 36 and 38 include retaining means 58 and 60, respectively adapted to engage their associated synchronizer sliding clutches 61 and 62. In the disclosed embodiment the synchronizer unit 32 is of a general type shown in U.S. Pat. No. 3,700,083 issued Oct. 24, 1972 to Ashikawa et al. The unit 32 is referred to as a "strutless" synchronizer unit. It will be noted in FIG. 2 that the sliding clutch 61 has internal splines 63 in constant engagement with external splines 64 of a clutch gear 65. The clutch gear in turn has internal splines 66 in constant engagement with external splines 67 on the transmission main shaft 22. Reference may be had to the above mentioned U.S. Pat. No. 3,700,083 for a detailed description of its operation. It is understood, however, that the synchronizer 32 is shown for purposes of illustration only and any type of manual transmission sliding clutch unit could be used with applicant's viscous damper coupling arrangement to be described below without departing from the scope of the present invention.

FIG. 1 shows the main or output shaft 22 having journalled on its surface a first speed gear 68 and a second speed gear 69 associated with first and second drive range synchronizer unit 34. Further, a third-speed gear 70 and a fourth-speed gear 72 are shown associated with third and fourth drive range synchronizer unit 32. The fourth-speed gear 72, partially shown in FIG. 2, is formed integral with the transmission input shaft 18.

To select the fourth drive range the shift lever 56 is manually operated to move the selector shaft 40 to the left until spring loaded detent 74 engages its recess 76. This results in the clutch 61 being moved to the left by fork 36 from its neutral position "N" to its fourth speed position "4" (see FIG. 1A). Thus, drive torque from the crankshaft is transferred from the input shaft 18 to the main shaft 22 by means of the synchronizer clutch external splines 64 engaging internal splines 77 of synchronizer left hand ratio gear 78. In a like manner upon the clutch 61 being moved to the right by fork 36 from its neutral position to its third speed position "3", the third speed gear 70 is locked to clutch gear 65 by means of clutch external splines 64 engaging inter splines 77' of right hand ratio gear 78'. The operation of blocker rings 79 and 79' are shown and described in the U.S. Pat. No. 3,700,083.

Transmission countershaft 80 is shown in FIG. 2 having its aft end supported in housing opening 82 by means of bearing 84 while bearing 86 supports the countershaft's forward end in housing wall 88. Formed integrally with the countershaft 80 are first and second range output gears 90 and 92 respectively. The gears 90 and 92 each form a portion of a torque delivery path for operation in the low or first speed range and the second speed range of the transmission. A fifth speed or overdrive gear 94 is shown in FIG. 1 splined to the forward end of the countershaft 80. A fifth speed or overdrive synchronizer 96 is controlled by its fork 98 supported on a shift rail (not shown). The fifth speed gear is meshed with fifth speed output gear 99 fixed on the main shaft 22 such as by splines or integrally formed therewith.

A reverse idler gear 100 is rotatably mounted on an idler shaft 102 as shown in FIG. 1. The reverse shifter fork 46 moves reverse clutch 104 rearwardly to couple the reverse gear 50 to the main shaft 22. As the idler gear 100 is in constant mesh with the reverse gear 50 the main shaft is driven in its reverse counter-clockwise direction by countershaft dual first and reverse output gear 90.

With reference to FIG. 2 a viscous damper coupling, generally indicated at 110, includes first 112 and second 114 driven gears concentrically supported on the countershaft adjacent its aft end. The first driven gear 112 has its internal bore 116 journally supported on the countershaft for relative rotation therewith. The juncture between bore 116 and the countershaft is sealed by means of an elastomeric O-ring seal 118 located in annual exterior groove 120 formed in the countershaft. The first driven gear 112 has its central hub portion 122 axially positioned at its left hand end by means of thrust washer 124 held by retaining snap ring 126 and radial pin 128. The first driven gear has its peripheral teeth in constant meshing engagement with the teeth of the fourth speed gear 72.

The second driven gear 114 is fixed on the countershaft 80 by suitable means such as its internal bore 130 sized to provide a shrink-fit mounting thereon. The second drive gear has its central hub portion 132 located with its right hand face abutting radial stepped face 134 of the countershaft. The second driven gear 114 has its peripheral teeth in constant meshing engagement with the peripheral teeth of the third speed gear 70 which is journally supported on the mainshaft 22 by means of roller bearings 136.

While the first and second driven gears 112 and 114 are shown having different gearing diameters or toothed peripheral surfaces their opposed hub portions 122 and 132 are essentially mirror images of each other. As best seen in FIGS. 4 and 5 the hub portions 122 and 132 have formed on their opposed ends sets of longitudinally extending gear teeth 140 and 142, respectively. The hub portion 122 has its set of axial gear teeth 140 loosely intermeshed with the set of axial gear teeth 142 of hub portion 132, as seen in FIG. 3.

A diametrical through-bore 144 is formed in the countershaft such that its principal axis 146 is located in the transverse plane of symmetry intermediate the opposed sets of axial teeth 140 and 142. As seen in FIG. 3 the diameter "D" of the through-bore 144 is substantially equal to the width "W" of each of the teeth.

FIG. 2 shows a cylindrical sleeve 150 concentrically surrounding the meshed axial teeth 140 and 142 together with opposed annular hub shoulders 152 and 154 of their associated gear hub portions 122 and 132, respectively. It will be noted that elastomeric O-ring seals 156 and 158 are provided in interior grooves 160 and 162 respectively, formed in the sleeve 150. Thus the sleeve 150 sealingly encloses a viscous fluid chamber or enclosure defined by the through-bore 144 being in fluid communication with the spaces between the loosely meshing sets of axial teeth 140 and 142.

A pair of opposed threaded filling apertures or port 164 and 166 are provided in the sleeve 150 having a common diametrical axis located in the transverse plane of axis 146. The ports 164 and 166 are sealed by threaded plugs 168 and 170, respectively. The ports 164 and 166 allow viscous dampening fluid to be introduced in the chamber. The opposed ports facilitate filling the chamber by allowing air to escape from the through-bore 144.

In operation with the chamber, comprising the through-bore 144 and spaces between the loosely meshing sets of teeth, filled with a suitable viscous fluid such as silicon fluid there is provided a viscous fluid dampener coupling between the input shaft 18 and the output gears on the countershaft 80. The coupling 110 effectively dampens out or absorbs all torsional vibration, backlash, oscillation rattles etc. which may be transmitted from the engine crankshaft via the input shaft 18 to the coupling first drive gear 112 on the countershaft. As a result the transmission output gears 90, 92, 94 and 114 and their associated main shaft speed gears 68, 69, 99 and 70 respectively, are isolated from any undesirable noise such as torsional vibrations from the crankshaft.

It will be appreciated that the through-bore 144 provides a simple and inexpensive reservoir arrangement to greatly enhance the volume of dampening fluid available for the coupling 110 with only a minimal redesign of the countershaft. Further, the second driven gear 114 of the coupling 110 functions as the transmission third drive gear. Although in fourth speed the drive torque is not dampened by the coupling viscous fluid torsional vibrations in the drive shaft are not of a high level. The reason for this is that in fourth speed, the torque is transferred only through the engaged splines 64 and 77 and not through the peripheral teeth of drive and speed gears in the case of the speed gears 1, 2, 3 and 5.

In a typical example, the spacing between opposed surfaces of the axial teeth 140 and 142 is of the order of 0.010 inch with the teeth centered. Thus, a total maximum backlash spacing of the order of 0.020 inch is provided. The teeth spacing, of course, may be adjusted along with the viscosity of the fluid, to achieve the desired dampening characteristics. Preferably, a silicone fluid having a viscosity within a predetermined centi-stokes range is provided in the chamber to dampen or control the torsional vibrations of each particular installation.

While the embodiment of the present invention as herein disclosed constitutes a preferred form, it is to be understood that changes and modifications might be adopted. Such changes and modification are contemplated by the inventor and he does not wish to be limited except to the scope of the approved claims.

What is claimed is:

1. A manual transmission comprising an input shaft adapted to be clutched to the crankshaft of an internal combustion engine, said input shaft having an input gear integral therewith; said input gear formed with peripheral teeth and having a concentric axial bore formed as an integral part of said input shaft; a transmission output shaft supported at its forward end by journal means located in said axial bore, said output shaft having a speed gear formed with peripheral teeth journalled thereon, a countershaft having an axis of rotation parallel with the axis of rotation of said output shaft, the improvement wherein said countershaft having a viscous fluid damper coupling supported thereon, said coupling comprising a first driven gear journalled on said countershaft, said first driven gear having peripheral teeth in constant meshed engagement with said input gear peripheral teeth, a second driven gear fixed on said countershaft for rotation therewith, said second driven gear having peripheral teeth in constant meshed engagement with said speed gear peripheral teeth, a diametrical through bore extending through said countershaft intermediate said first and second driven gears, each said first and second driven gears formed with a set of longitudinally extending mirror image axial teeth arranged concentrically about said axis of rotation, said sets of axial teeth being sized to mesh in a loose fitting manner defining predetermined interconnected clearance spaces between said sets of axial teeth, said spaces being in communication with said through-bore and providing limited freedom of rotary movement of said first driven gear relative to said countershaft and said second driven gear, a hollow sleeve concentrically surrounding said sets of axial teeth, means sealing said sleeve to associated portions of said driven gears while allowing relative rotary movement between said sleeve and said first driven gear, means sealing said first driven gear to said countershaft whereby said sleeve and said first and second driven gears providing a sealed viscous fluid chamber comprising said through-bore and said interconnected spaces between said loosely mating axial teeth, clutch means for selectively connecting said speed gear in driving engagement with said output shaft, wherein upon said clutch means connecting said speed gear in driving engagement with said output shaft, the viscous fluid in said chamber providing a dampening medium substantially obviating the transfer of torsional vibrations from said input shaft to said countershaft and thus to said output shaft speed gear.

2. The manual transmission as set forth in claim 1, wherein said diametrical through-bore having its principal axis located in a transverse plane of symmetry between said meshed sets of axial teeth.

3. The manual transmission as set forth in claim 1, wherein said through-bore having a diameter substantially equal to the width of each of said axial teeth.

4. A multiple speed ratio manual transmission comprising an input shaft adapted to be clutched to the crankshaft of an internal combustion engine, said input shaft having an input gear integral therewith; said input gear formed with peripheral radial teeth and having a concentric axial opening formed as an integral part of said input shaft; a transmission output shaft supported at its forward end by journal means located in said axial opening, said output shaft having a plurality of speed gears journalled thereon, each said speed gear formed with peripheral teeth, a countershaft having an axis of rotation parallel with the axis of rotation of said output shaft, the improvement wherein said countershaft having a viscous fluid damper coupling supported thereon, said coupling comprising a first driven gear journalled on said countershaft said first driven gear having peripheral teeth in constant meshed engagement with said input gear peripheral teeth, a second driven gear fixed on said countershaft for rotation therewith, said second driven gear having peripheral teeth in constant meshed engagement with one of said speed gears peripheral teeth, a diametrical through bore extending through said countershaft intermediate said first and second driven gears, each said first and second driven gears formed with a set of longitudinally extending mirror image axial teeth arranged concentrically about said axis of rotation, said sets of axial teeth being sized to mesh in a loose fitting manner defining predetermined interconnected clearance spaces between said sets of axial teeth, said spaces being in communication with said through-bore and providing limited freedom of rotary movement of said first driven gear relative to said countershaft and said second driven gear, a hollow sleeve concentrically surrounding said sets of axial teeth, means sealing said sleeve to associated portions of said driven gears allowing relative rotary movement between said sleeve and said first driven gear, means sealing said first driven gear to said countershaft whereby said sleeve and said first and second driven gears providing a sealed viscous fluid chamber comprising said through-bore and said interconnected spaces between said loosely mating gear teeth, clutch means for selectively connecting each said speed gear in driving engagement with said output shaft, wherein the viscous fluid in said chamber provides a dampening medium substantially obviating the transfer of torsional vibrations from said input shaft to said countershaft and, in turn, to said output shaft speed gears.

5. The multiple speed ratio manual transmission as set forth in claim 4, wherein said diametrical through-bore having its principal axis located in a transverse plane of symmetry between said meshed sets of axial teeth.

6. The multiple speed ratio manual transmission as set forth in claim 4, wherein said through-bore having a diameter substantially equal to the width of each of said axial teeth.

7. A multiple speed ratio manual transmission comprising an input shaft adapted to be clutched to the crankshaft of an internal combustion engine, said input shaft having an input gear integral therewith; said input gear having a concentric axial bore formed as an integral part of said input shaft; a transmission output shaft supported at its forward end by journal means located in said axial bore, said output shaft having a plurality of speed gears journalled thereon, a countershaft having an axis of rotation parallel with the axis of rotation of said output shaft, the improvement wherein said countershaft having a viscous fluid damper coupling supported thereon, said coupling comprising a first driven gear journalled on said countershaft, a second driven gear fixed on said countershaft for rotation therewith, a diametrical through-bore extending through said countershaft intermediate said first and second driven gears, said first and second driven gears having integral opposed cylindrical hub portions concentrically disposed about said countershaft, said opposed hub portions having longitudinally extending sets of loosely meshed axial teeth sized to provide limited freedom of rotary movement of said first driven gear relative to said second driven gear, a hollow constant diameter sleeve having an annular inner surface, said sleeve inner surface concentrically surrounding said hub portions, means sealing each hub outer cylindrical surface to an associated portion of said sleeve inner surface while allowing relative rotary movement between said sleeve and said first driven gear hub, means sealing each said first and second driven gear to said countershaft providing a sealed viscous fluid chamber defined by said through-bore and the interconnected spaces between said loosely mating gear teeth, a plurality of drive gears supported on said countershaft, said plurality of speed gears journalled on said output shaft in meshing engagement with an associated countershaft drive gear, a plurality of clutch means for selectively connecting each said speed gear in driving engagement with said output shaft, wherein the viscous fluid in said chamber provides a dampening medium substantially obviating the transfer of torsional vibrations from said input shaft to said countershaft and, in turn, to said output shaft speed gears.

8. The multiple speed ratio manual transmission as set forth in claim 7, wherein said diametrical through-bore having its principal axis located in a transverse plane of symmetry between said meshed sets of axial teeth.

9. The multiple speed ratio manual transmission as set forth in claim 7, wherein said through-bore having a diameter substantially equal to the width of each of said axial teeth.

* * * * *